US006995477B2

(12) United States Patent
Fan

(10) Patent No.: US 6,995,477 B2
(45) Date of Patent: Feb. 7, 2006

(54) MULTI-FUNCTIONAL POWER SOURCE

(76) Inventor: Guo Xiang Fan, 4951 Commerce Dr., Baldwin Park, CA (US) 91706

( * ) Notice: Subject to any disclaimer, the term of this patent is extended or adjusted under 35 U.S.C. 154(b) by 0 days.

(21) Appl. No.: 11/042,908

(22) Filed: Jan. 24, 2005

(65) Prior Publication Data

US 2005/0121914 A1    Jun. 9, 2005

Related U.S. Application Data

(62) Division of application No. 10/720,312, filed on Nov. 25, 2003.

(51) Int. Cl.
*H02P 9/04* (2006.01)

(52) U.S. Cl. .................. 290/1 A; 290/1 B; 290/1 R; 290/31; 290/22; 290/40; 290/29

(58) Field of Classification Search ............... 290/1 B, 290/1 A, 1 R, 31, 22, 40, 40 R, 29; 310/60 R
See application file for complete search history.

(56) References Cited

U.S. PATENT DOCUMENTS 4,779,905 A * 10/1988 Ito et al. .................... 290/1 B
6,278,194 B1 * 8/2001 Nakagawa et al. ........... 290/31
6,437,456 B1 * 8/2002 Kimura et al. ............... 290/31
6,800,969 B2 * 10/2004 Ogawa ...................... 310/49 R

* cited by examiner

*Primary Examiner*—Darren Schuberg
*Assistant Examiner*—Iraj A. Mohandesi
(74) *Attorney, Agent, or Firm*—Raymond Y. Chan; David & Raymond

(57) ABSTRACT

A multi-functional power source includes a generator and an engine arrangement to drive a crankshaft to rotate. The generator includes a generator housing, a rotor which couples with the crankshaft and includes a magnetic element coaxially and rotatably disposed within the generator housing and defining a magnetic cavity within the magnetic element, and a coil assembly coaxially disposed within the magnetic cavity such that when the magnetic element of the rotor is driven to rotate, the coil assembly is adapted for producing the induced electric power. An output axle, having an output end, is integrally extended from the crankshaft to a position out of the generator housing such that when the crankshaft drives the output axle to rotate, the output end of the output axle is adapted for producing an external mechanical power simultaneously when the generator produces the induced electric power.

8 Claims, 3 Drawing Sheets

MULTI-FUNCTIONAL POWER SOURCE

CROSS REFERENCE OF RELATED APPLICATION

This is a Divisional application that claims the benefit of priority under 35 U.S.C.§119 to a non-provisional application, application Ser. No. 10/720,321, filed Nov. 25, 2003, the entire contents of which is incorporated herewith by reference.

BACKGROUND OF THE PRESENT INVENTION

1. Field of Invention

The present invention relates to a power generator, and particularly to a multi-functional power source that is capable of outputting an electric power and an external mechanical power simultaneously.

2. Description of Related Arts

Conventional power generator includes an internal combustion engine and a generator directly connected to and driven by the engine to generate electricity. The engine produces mechanical power to drive a crankshaft to rotate. The crankshaft is connected with a revolving shaft of the generator which can induce electrical current by transforming the mechanical power produced from the engine into electrical energy due to the relative movement between a magnetic field and electrically conductive elements.

Efforts have been dedicated to make the conventional generators lighter and smaller. For example, U.S. Pat. Nos. 4,595,841, 5,093,611, 4,647,835 and 5,555,853 have disclosed various kinds of portable generators. However, the aforesaid conventional portable generators are not practically portable because of their heavy weight and large size. They claim portable simply because they have incorporated a carrying means. Such as, U.S. Pat. No. 5,555,853 provides a back-pack for carrying the engine/alternator unit; U.S. Pat. No. 4,647,835 provides a box casing with handle for carrying the portable generator. In fact, the conventional portable generator is difficult to be transported in a car trunk and is hard to be carried by a female or a junior with one hand.

One challenge of making a generator portable falls in its cooling system. In order to produce undirectional cooling air for cooling the engine and the generator, cooling fans are installed to cool the engine and the generator respectively. U.S. Pat. No. 4,647,835 suggests how to incorporate a single cooling fan at the connection portion of a crankshaft in the engine and a revolving shaft in the generator. The cooling fans not only increase the size of the portable generator, but also increase the weight of the portable generator.

Another challenge of making a generator portable has to do with its structural arrangement. The conventional structure of the generator is relatively complicated. A revolving shaft, supported by bearings, is extended through the alternator from the crankshaft either to connect and drive the rotor with permanent magnets to coaxially rotate within the stator inductor, or to connect and drive the rotor with permanent magnets around the stator inductor. However, these elongated shaft, supporting bearings, and shells unnecessarily increase the weight and size of the conventional portable generator.

Very often, the portable generators are used in association with a different kind of power source to accomplish a task. For example, a generator is usually used to supply electric power for lightening a mining tunnel where an engine is simultaneously running to mechanically power a water pump for extracting water out of the mining tunnel. Carrying the generator and engine requires a great deal of efforts, especially in a mining tunnel where the road is always unpaved and steep. Given the size and weight of the generator and engine, accidences may happen to jeopardize the safety of mine works in the course of moving them in the mining tunnel.

One solution to the abovementioned situation is to carry a portable generator to supply electric power for lightening the water pumping in order to avoid the burden of carrying a generator and engine in the mining tunnel. However, this solution may waste energy. As mentioned above, the portable generator already includes a built-in engine for outputting mechanical energy, and the generator transforms the mechanical energy into electric energy for power supply. The waste happens when using the electricity produced by the generator to power a water pump, which can directly function by tapping to a mechanical power source. The energy transformation from mechanical to electric to mechanical is a waste.

Thus, what is needed is a portable power source with a compact structure and effective cooling system that is capable of outputting two kinds of power, i.e., electric and mechanical energy, for convenience of usage and saving energy.

SUMMARY OF THE PRESENT INVENTION

An objective of the present invention is to provide a multi-functional power source which outputs both the electric power and mechanical power.

Another objective of the present invention is to provide a multi-functional power source, which comprises a generator that not only generates an internal mechanical power to an internal combustion engine for generating the electric power but also produces the external mechanical power via an output axle.

Another objective of the present invention is to provide a multi-functional power source, which comprises an engine and generator for simultaneously outputting electric and mechanical energy in order for driving electric and mechanical devices with a single power source.

Another objective of the present invention is to provide a multi-functional source with an elongated shaft driven by the abovementioned engine for outputting mechanical energy and driving the abovementioned generator for outputting electric energy.

Another objective of the present invention is to provide a multi-functional power source having a lightweight and compact size for easy storage and carrying, wherein the weight and size of the power source is minimized by constructing with minimum components to perform high efficiency.

Another objective of the present invention is to provide a multi-functional power source comprising a flywheel embedded with fan wings for cooling the power source, while keep it compact and light.

Accordingly, in order to accomplish the above objects, the present invention provides a multi-functional power source for generating both electrical power and mechanical power, comprising a generator and an engine arrangement.

The generator, which is adapted for outputting induced electric power, comprises a generator housing defining a receiving chamber, a rotor comprising a magnetic element coaxially and rotatably disposed within the receiving chamber and defining a magnetic cavity within the magnetic element, and a stator comprising a coil assembly coaxially disposed within the magnetic cavity.

The engine arrangement comprises an engine casing, an internal combustion engine disposed in the engine casing, an elongated crankshaft having an driven portion extended from the internal combustion engine and a driving portion extended out of the engine casing to couple with the rotor, in such a manner that when the internal combustion engine produces a mechanical power to drive the rotor to rotate through the crankshaft, the magnetic element is coaxially rotated to induce with the coil assembly for producing the induced electric power, and an output axle, having an output end, integrally extended from the crankshaft to a position out, of the generator housing such that when the crankshaft drives the output axle to rotate, the output end of the output axle is adapted for producing the external mechanical power, even when the generator produces the induced electric power.

These and other objectives, features, and advantages of the present invention will become apparent from the following detailed description, the accompanying drawings, and the appended claims.

DETAILED DESCRIPTION OF THE PREFERRED EMBODIMENT

Figure 1:
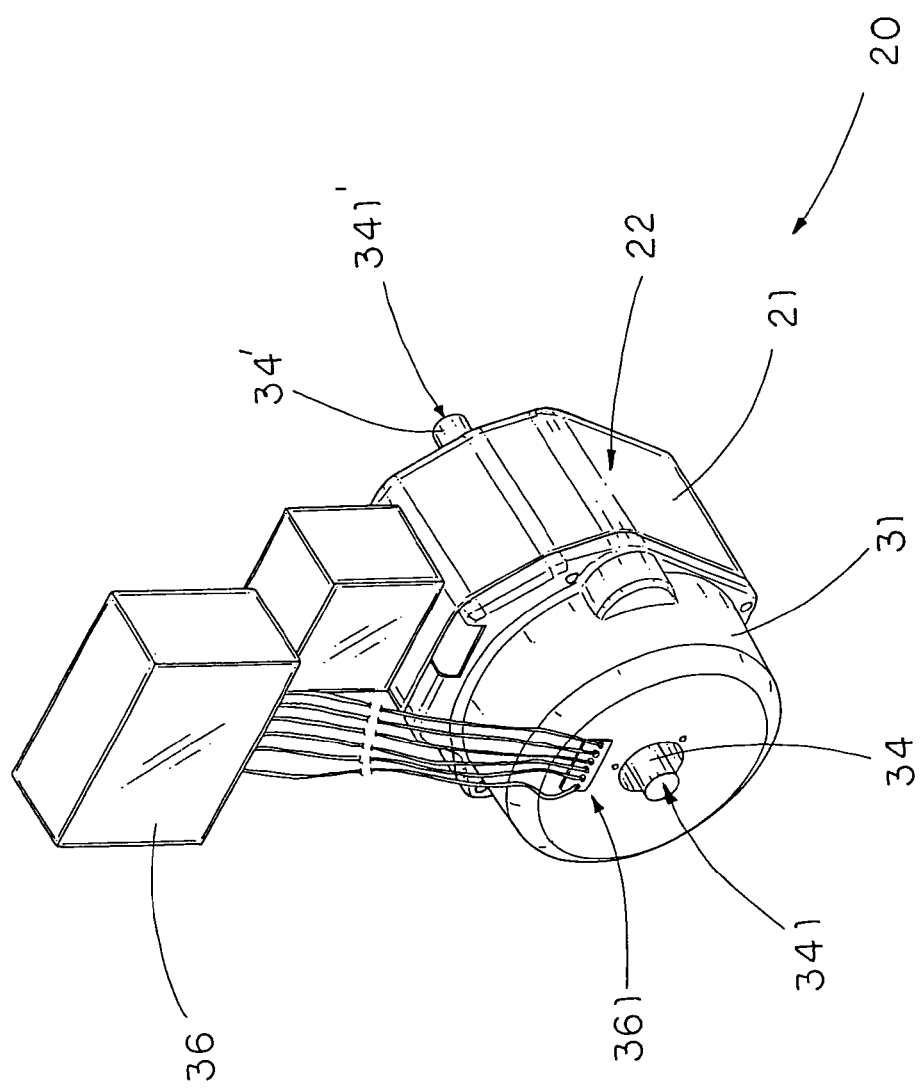
FIG. 1 is a perspective view of the multi-functional power source according to a preferred embodiment of the present invention.
Figure 2:
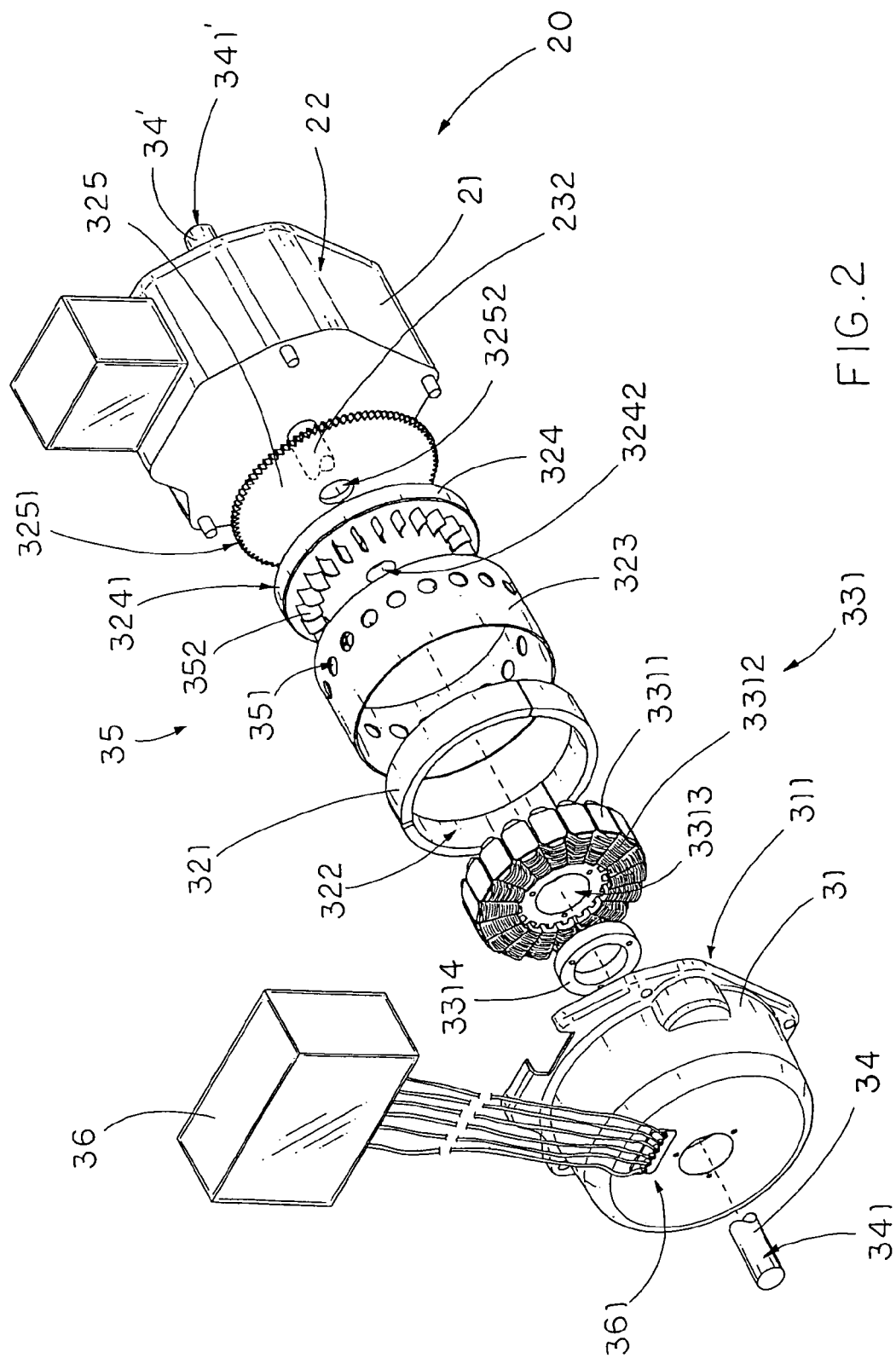
FIG. 2 is a partially exploded view of the multi-functional power source according to the preferred embodiment of the present invention.
Figure 3:
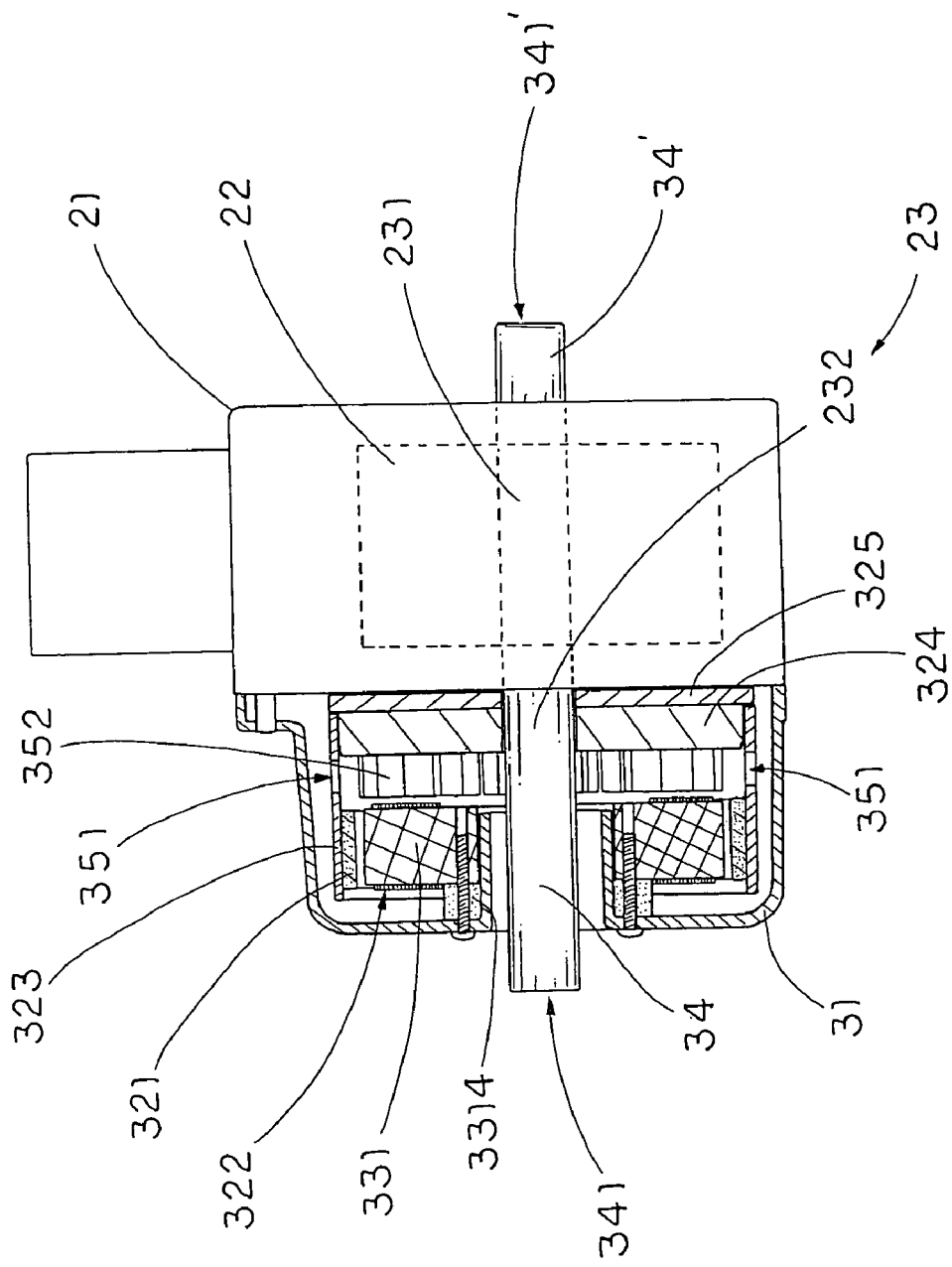
FIG. 3 is a partial cross-sectional view of the multi-functional power source according to the preferred embodiment of the present invention.

Referring to FIGS. 1 to 3, a multi-functional power source 10 for producing an external mechanical power according to a preferred embodiment of the present invention is illustrated, wherein the multi-functional power source 10 comprises a generator 30 and an engine arrangement 20.

The generator 30, which is adapted for outputting induced electric power, comprises a generator housing 31 defining a receiving chamber 311, a rotor 32 comprising a magnetic element 321 coaxially and rotatably disposed within the receiving chamber and defining a magnetic cavity 321 within the magnetic element 321, and a stator 33 comprising a coil assembly 331 coaxially disposed within the magnetic cavity 322.

The engine arrangement 20 comprises an engine casing 21, an internal combustion engine 22 supported in the engine casing 21, an elongated crankshaft 23 having an driven portion 231 extended from the internal combustion engine 22 and a driving portion 232 extended out of the engine casing 21 to couple with the rotor 32 in such a manner that when the internal combustion engine 22 produces a mechanical power to drive the rotor 32 to rotate through the crankshaft 23, the magnetic element 321 can be coaxially rotated to induce with the coil assembly 331 for producing the induced electric power.

The engine arrangement 20 further comprises an output axle 34, having an output end 341, integrally extended from the crankshaft 23 to a position out of the generator housing 31 such that when the crankshaft 23 drives the output axle 34 to rotate, the output end 341 of the output axle 34 is adapted for producing the external mechanical power, even when the generator 30 is producing the induced electric power.

According to the preferred embodiment, the internal combustion engine 22 is a spark-ignited internal combustion engine which transforms chemical energy into mechanical energy which is output via the rotation movement of the crankshaft 23, which extends out of the engine casing 21. In this preferred embodiment, the internal combustion engine 22 is fueled with diesel. It is noted that other fuel, such as gasoline, can also be used for the internal combustion engine 22.

According to the preferred embodiment, the rotor 32 further comprises a tubular sleeve 323 rotatably disposed in the receiving chamber 311, a flywheel 324 coaxially and rotatably mounted to an inner circumferential sidewall of the tubular sleeve 323, and a flywheel starting gear 325 securely engaged with the flywheel 324 to coaxially couple with the driving portion 232 of the crankshaft 23, wherein the magnetic element 321 is coaxially attached to the inner circumferential sidewall of the tubular sleeve 323 in such a manner that when the flywheel starting gear 325 is driven to rotate via the crankshaft 23, the flywheel 324 is driven to rotate to drive the magnetic element 321 to rotate via the tubular sleeve 323 so as to induce the magnetic element 321 with the coil assembly 331 for producing the induced electric power.

As shown in FIG. 2, the flywheel starting gear 325 has a plurality of driving teeth 3251 evenly provided at an outer circumferential edge thereof to engage with the flywheel 324 and a gear central hole 3252, wherein the driving portion 232 of the crankshaft 23 is securely inserted into the gear central hole 3252 to engage with the flywheel starting gear 325 so as to drive the flywheel starting gear 325 to rotate when the crankshaft 23 is rotated.

The flywheel 324 has an outer circumferential sidewall 3241 securely attached to the inner circumferential sidewall of the tubular sleeve 323 and a plurality of engaging teeth 3242 evenly provided at a rear side of the flywheel 324 to engage with the driving teeth 3251 of the flywheel starting gear 325 such that the flywheel 324 is driven to rotate with the flywheel starting gear 325 is rotated, as shown in FIG. 3.

The generator 30 further comprises an air ventilation arrangement 35 for facilitating air circulation wherein the air ventilation arrangement 35 has a plurality of ventilating through holes 351 evenly formed on the tubular sleeve 323 to radially project with respect to the magnetic cavity 322 and comprises a plurality of fan wings 354 radially provided at a front side of the flywheel 324 to respectively align with the ventilating through holes 351 in such a manner that when the flywheel 324 is driven to rotate, the fan wings 352 are adapted for ventilating an air within the tubular sleeve 323 through the ventilating through holes 351 so as to enhance the cooling effect of the generator 30.

According to the preferred embodiment, the magnetic element 321 is a magnet having a ring shape securely affixed to the inner circumferential sidewall of the tubular sleeve 323 to define the magnetic cavity 322 within an inner circumferential side of the magnetic element 321. Accordingly, a magnetic field is thereby created within the magnetic cavity 322 towards the coil assembly 331.

The coil assembly 331 comprises a plurality of wire coils 3311 radially positioned in the magnetic cavity 322 of the magnetic element 321 to form a coil disc 3312, having a central stator hole 3313, securely supported within the magnetic cavity 322.

Accordingly, the coil assembly 331 further comprises a coil spacer 3314, having a ring shape, coaxially attached the coil disc 3312 to an inner sidewall of the generator housing 31 so as to securely retain the coil assembly 331 within the generator housing 31 in position. Accordingly, the coil spacer 3314 prevents the coil disc 3312 from directing touching the generator housing 31, while keeping the coil disc 3312 relatively stable with respect to the rotor 32, as the elongated crankshaft 23 drives the rotor 32 to rotate.

The generator 30 further comprises an electrical control box 36 having an electric terminal 361 extended to electrically connect with the coil assembly 331 through the generator housing 31 for tapping the electric power generated from the coil assembly 331 for electric power supply.

As shown in FIG. 3, the output axle 34 is integrally and coaxially extended from the driving portion 232 of the crankshaft 23 through the generator housing 31, wherein the output end 341 of the output axle 34 is coaxially extended through the central stator hole 3313 of the coil assembly 331 to an exterior of the generator housing 31.

Accordingly, the flywheel 324 has a central hole 3242 having a diameter substantially larger than a diameter of the output axle 34 such that the output axle 34 is coaxially passed from the central hole 3242 of the flywheel 324 through the magnetic cavity 322 to the exterior of the generator housing 31.

How the multi-functional power source 10 of the present invention is able to output two kinds of power is better understood by referring the FIG. 3. When the crankshaft 23 is driven to rotate by the internal mechanical power of the internal combustion engine 22, the rotor 32 is driven to rotate such that the rotational movement of the flywheel 324 drives the magnetic element 321 to rotate around the coil assembly 331. Due to the induction of the coil assembly 331, the magnetic filed created by the magnets 321 within the magnetic cavity 322 induces with the wire coils 3311 to generate induced electric power.

At the same time, the output axle 34 is driven to rotate via the rotational movement of the crankshaft 23 such that the output end 341 of the output axle 34 is adapted to produce the external mechanical power. As a result, external devices, likes water pump and air compressor, can be connected to the output end 341 of the output axle 34 for supply of mechanical power. Therefore, the multi-functional power source 10 of the present invention is capable of outputting mechanical and electric powers simultaneously.

It is worth to mention that, the multi-functional power source 10 is able to stay cool as it is functioning. When the rotor 32 rotates, the fan wings 352 circulate the air within the tubular sleeve 323 through the ventilating holes 351. Thus, the cool air is constantly supplied to cool the stator 33, which has a tendency of heating up as induced electricity current flows through the coil assembly 331. In other words, an independently conventional generator cooling fan can be eliminated to reduce the weight and size of the portable generator of the present invention.

In addition, the structure of the multi-functional power source 10 of the present invention is configured to have a lightweight and compact size for easy storage and carriage since the weight and size of the generator 30 is minimized by constructing with minimum components to perform high efficiency, i.e. rotating the magnetic element 321 around the coil assembly 331 and omitting the conventional cooling fan for air ventilation.

FIG. 3 also illustrates an alternative mode of the output axle 34' wherein the output axle 34', having an output end 341', integrally and coaxially extended from the crankshaft 23 at a direction opposite to the generator 30, such that the output end 341' is extended to the exterior of the engine casing 22.

Accordingly, the engine casing 21 has an engine hole 211' provided at a position coaxially align with the driven portion 231 of the crankshaft 23, wherein the output axle 34' is integrally and coaxially extended from the driven portion 231 of the crankshaft 23 to the exterior of the engine casing 22 through the engine hole 211' in a direction away from the generator housing 31 for outputting the external mechanical power.

It is worth to mention that the output axle 34' can be embodied as a second output axle 34'. Therefore, the output axle 34 and the second output axle 34' are respectively extended from the driving portion 232 and the driven portion 231 of the crankshaft 23 out of the generator housing 31 and the engine casing 21 for providing two external mechanical power outlets. In is noted that more mechanical power outlets not aligning along an axis can be provided via the combination of mechanical components without departing the spirit of the invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-functional power source for producing an external mechanical power, comprising:
    a generator for outputting induced electric power, comprising:
    a generator housing having a receiving chamber;
    a rotor comprising a magnetic element which is coaxially and rotatably disposed within said receiving chamber and defines a magnetic cavity therein, and
    a stator comprising a coil assembly coaxially disposed within said magnetic cavity; and
    an engine arrangement, comprising:
    an internal combustion engine;
    a crankshaft having an driven portion extended from said internal combustion engine and a driving portion coupled with said rotor in such a manner that, when said internal combustion engine produces a mechanical power to drive said rotor to rotate through said crankshaft, said magnetic element is rotated to induce with said coil assembly for producing said induced electric power; and
    an output axle extended from said crankshaft to a position out of said generator housing, wherein when said crankshaft drives said output axle to rotate, said output axle is adapted for producing said external mechanical power, wherein said output axle is integrally extended from said crankshaft and has an output end being driven to rotate for producing said external mechanical power even when said generator is producing said induced electric power, wherein said output axle is integrally and coaxially extended from said driving portion of said crankshaft while said output end of said output axle is coaxially extended through said magnetic cavity to an exterior of said generator housing, wherein said engine assembly further comprises a second output axle, having a second output end, integrally and coaxially extended from said driven portion of said crankshaft while said second output end of said second output axle is coaxially extended to an exterior of said engine casing at a direction opposite to said output end of said output axle, wherein said coil assembly comprises a plurality of wire coils radially positioned within said magnetic cavity of the magnetic element to form a coil disc, having a central stator hole, securely supported within said magnetic cavity, wherein said output axle is coaxially extended through said central stator hole to said exterior of said generator housing.

2. A multi-functional power source for producing an external mechanical power, comprising:
   a generator for outputting induced electric power, comprising:
   a generator housing having a receiving chamber;
   a rotor comprising a magnetic element which is coaxially and rotatably disposed within said receiving chamber and defines a magnetic cavity therein, and
   a stator comprising a coil assembly coaxially disposed within said magnetic cavity, wherein said coil assembly comprises a plurality of wire coils radially positioned within said magnetic cavity of said magnetic element to form a coil disc, having a central stator hole, securely supported within said magnetic cavity; and
   an engine arrangement, comprising:
   an internal combustion engine;
   a crankshaft having an driven portion extended from said internal combustion engine and a driving portion coupled with said rotor in such a manner that, when said internal combustion engine produces a mechanical power to drive said rotor to rotate through said crankshaft, said magnetic element is rotated to induce with said coil assembly for producing said induced electric power; and
   an output axle extended from said crankshaft to a position out of said generator housing, wherein when said crankshaft drives said output axle to rotate, said output axle is adapted for producing said external mechanical power, wherein said output axle is coaxially extended through said central stator hole to said exterior of said generator housing.

3. The multi-functional power source, as recited in claim 2, wherein said output axle is integrally extended from said crankshaft and has an output end being driven to rotate for producing said external mechanical power even when said generator is producing said induced electric power.

4. The multi-functional power source, as recited in claim 2, wherein said output axle is integrally and coaxially extended from said driving portion of said crankshaft while said output end of said output axle is coaxially extended through said magnetic cavity to an exterior of said generator housing.

5. The multi-functional power source, as recited in claim 3, wherein said output axle is integrally and coaxially extended from said driving portion of said crankshaft while said output end of said output axle is coaxially extended through said magnetic cavity to an exterior of said generator housing.

6. The multi-functional power source, as recited in claim 3, wherein said engine assembly further comprises a second output axle, having a second output end, integrally and coaxially extended from said driven portion of said crankshaft while said second output end of said second output axle is coaxially extended to an exterior of said engine casing at a direction opposite to said output end of said output axle.

7. The multi-functional power source, as recited in claim 5, wherein said engine assembly further comprises a second output axle, having a second output end, integrally and coaxially extended from said driven portion of said crankshaft while said second output end of said second output axle is coaxially extended to an exterior of said engine casing at a direction opposite to said output end of said output axle.

8. The multi-functional power source, as recited in claim 2, wherein said output axle is integrally and coaxially extended from said driven portion of said crankshaft and has an output end extended to an exterior at a direction opposite to said generator.

* * * * *